United States Patent
Geary et al.

(10) Patent No.: US 6,990,256 B2
(45) Date of Patent: Jan. 24, 2006

(54) SEGMENTED MODULATOR FOR HIGH-SPEED OPTO-ELECTRONICS

(75) Inventors: John Michael Geary, Longswamp Township, PA (US); Joseph Michael Freund, Fogelsville, PA (US); Frank Stephen Walters, Kutztown, PA (US); Thomas Gordon Beck Mason, Bethlehem, PA (US); Charles William Lentz, Reading, PA (US)

(73) Assignee: TriQuint Technology Holding Co., Hillsboro, OR (US)

( * ) Notice: Subject to any disclaimer, the term of this patent is extended or adjusted under 35 U.S.C. 154(b) by 369 days.

(21) Appl. No.: 10/175,665

(22) Filed: Jun. 20, 2002

(65) Prior Publication Data
US 2003/0235359 A1    Dec. 25, 2003

(51) Int. Cl.
*G02F 1/035* (2006.01)
*G02F 1/03* (2006.01)

(52) U.S. Cl. .................. 385/2; 385/1; 359/245

(58) Field of Classification Search ............ 385/1–10; 395/245
See application file for complete search history.

(56) References Cited

U.S. PATENT DOCUMENTS

2002/0159665 A1 * 10/2002 Burle et al. ................. 385/1

* cited by examiner

*Primary Examiner*—Akm Enayet Ullah
*Assistant Examiner*—Kevin S. Wood
(74) *Attorney, Agent, or Firm*—Christie, Parker & Hale

(57) ABSTRACT

An optical modulator includes first and second modulator segments. The first and second modulator segments form an optical signal path for an optical signal. The optical modulator also includes an electrical signal path capable of receiving and carrying a modulation signal, which is applied to the optical signal at the first and second modulation segments to generate a modulated optical signal. An inductive element may be disposed between electrical inputs to the first and second modulator segments. The optical modulator may be an electro-absorption modulator (EAM). The inductive element may be an inductor or a transmission line segment.

18 Claims, 6 Drawing Sheets

S21 (dB vs Hz)

230

S11 (dB vs Hz)

240

SEGMENTED MODULATOR FOR HIGH-SPEED OPTO-ELECTRONICS

FIELD OF THE INVENTION

This invention is related to high-speed optical communications, and in particular to the segmentation of a traveling-wave modulator to provide both impedance matching and velocity matching.

BACKGROUND OF THE INVENTION

A modulator typically includes two conductive regions with a modulation region between them, through which an optical waveguide passes. In operation, bits can be imposed on the light passing through the modulator's waveguide by applying a voltage that has either of two values. One value makes the modulator more transparent, while the other value makes it more opaque. The ratio of the optical power exiting the modulator in these two states, for given values of voltage, is called an extinction ratio. The maximum rate at which bits can be imposed on the light is called a bit rate. At high bit rates, the voltage applied to the modulator varies very rapidly, so the performance of the modulator becomes increasingly important as the modulation frequency increases. It is desirable for modulators to have both the high extinction ratio and high bit rate.

Conventionally, a modulator is operated as a simple lumped device. An input transmission line with a characteristic impedance Z0 typically connects to the modulator, which is directly shorted by a load resistor with resistance Rload, which is typically equal to Z0. Unfortunately, this is a non-ideal approximation to the desired matched load situation, because the parallel combination of the modulator's lumped parasitic and Rload terminate the line, not just Rload alone.

As transmission frequencies increase, e.g., to data rates of 40 gigabits per second (Gbps) and beyond, the impedance of this parallel combination typically gets lower and lower due to the fact that impedance of a capacitor is inversely proportional to frequency and behaves increasingly like a short as frequency increases. Consequently, at increased frequency, the load at the end of the input line typically becomes more and more poorly matched to the line. This in turn causes increased reflection back on the input line, and decreased signal at the modulator. Both of these effects limit performance of the modulator at high frequency and hence limit bit rate.

These limitations on high frequency performance may be alleviated by making the modulator shorter along the direction of the optical waveguide. The parasitic capacitance of the modulator would then be reduced, approximately in proportion to length. This may improve the high frequency performance. However, it would also decrease the modulator's extinction ratio, which is approximately proportional to its length. Thus, there typically is an unfortunate trade-off between these two desirable aspects of modulator performance.

SUMMARY

In an exemplary embodiment according to the present invention, an optical modulator is provided. The optical modulator includes a first modulator segment, a second modulator segment, and an electrical signal path. The first and second modulator segments form an optical signal path for an optical signal. The electrical signal path is capable of receiving and carrying a modulation signal. The modulation signal is applied to the optical signal at said first and second modulation segments to generate a modulated optical signal.

In another exemplary embodiment according to the present invention, a transmitter is provided. The transmitter includes: an optical source capable of generating an optical signal; an optical modulator capable of receiving the optical signal and a modulation signal, and applying the modulation signal to the optical signal generate a modulated optical signal; and a data modulator capable of receiving the modulated optical signal and a data signal, and applying the data signal to the modulated optical signal to generate an optical data signal, wherein at least one of the optical modulator and the data modulator includes: a first modulator segment; and a second modulator segment, said first and second modulator segments forming an optical signal path for the optical signal or the modulated optical signal, respectively, wherein the modulation signal or the data signal is applied, respectively, to the optical signal or the modulated optical signal at said first and second modulation segments to generate the modulated optical signal or the optical data signal, respectively.

In yet another embodiment according to the present invention, an optical transmission system is provided. The optical transmission system includes: a transmitter capable of generating and transmitting an optical data signal; a transmission medium over which the optical data signal can be transmitted; and a receiver capable of receiving the optical data signal, wherein the transmitter includes an optical modulator, which includes: a first modulator segment; and a second modulator segment, said first and second modulator segments forming an optical signal path for an optical signal, wherein the modulation signal is applied to the optical signal at said first and second modulation segments to generate the optical data signal.

In still another exemplary embodiment according to the present invention, a method of improving a frequency characteristic of an optical modulator is provided. The optical modulator is divided into a plurality of modulator segments, and an inductive element is disposed between electrical inputs of at least two of the modulator segments.

BRIEF DESCRIPTION OF THE DRAWINGS

These and other aspects of the invention may be understood by reference to the following detailed description, taken in conjunction with the accompanying drawings, wherein.

DETAILED DESCRIPTION

Figure 1:
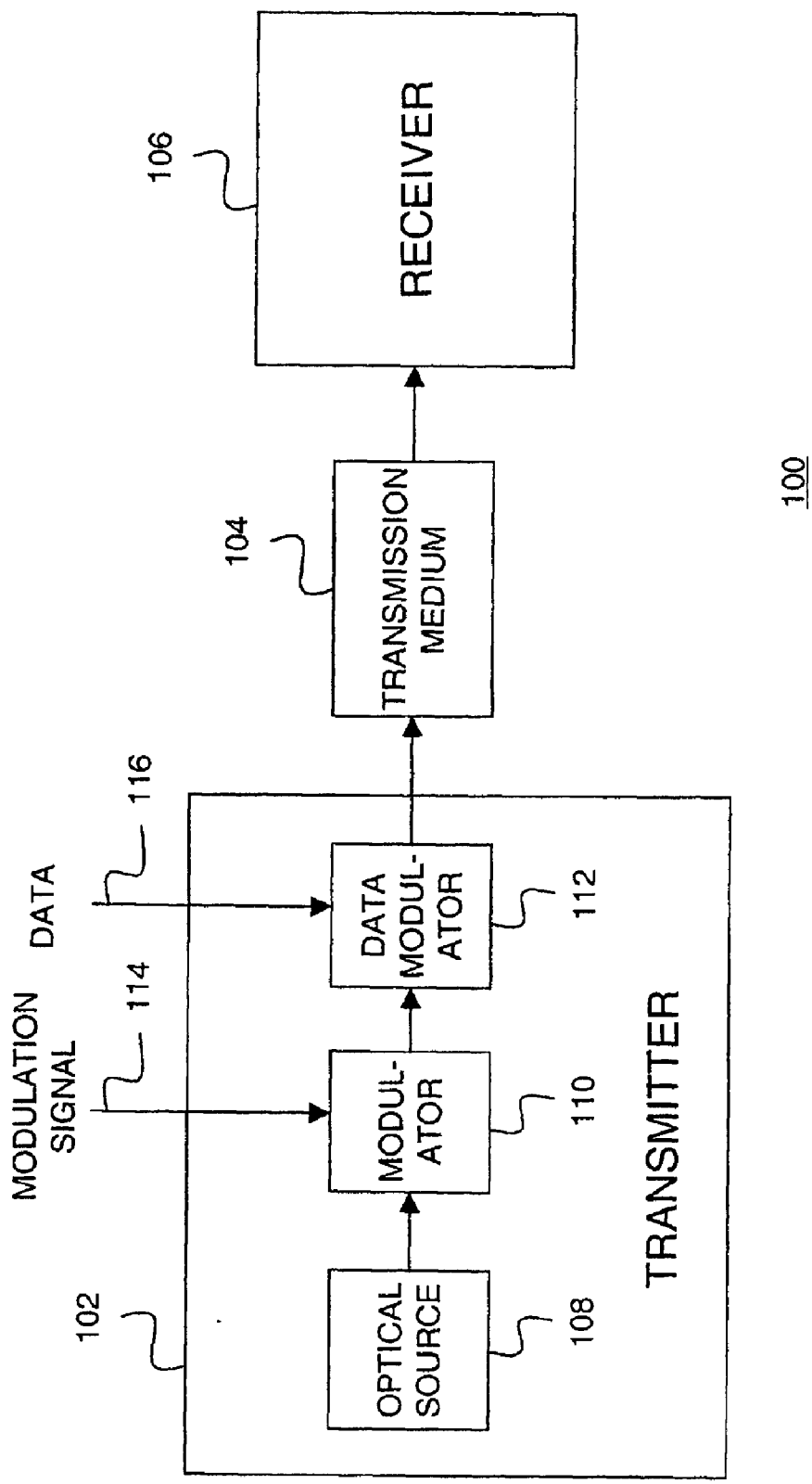
FIG. 1 illustrates an optical communication system, in which an exemplary embodiment according to the present invention may be applied.

In order to address the problem associated with the trade-off between extinction ratio and bit rate at high frequencies, a traveling-wave modulator of a continuous variety has been developed. In such a design, the modulator itself becomes a transmission line, with the modulator's parasitic capacitance Cmod distributed over its length. The capacitance per unit length of C*mod is therefore equal to Cmod divided by the modulator's length. A narrow metal contact of the modulator serves as a distributed inductor with an inductance per unit length of L*mod. Thus the modulator's characteristic impedance Zmod and propagation velocity Vmod are given by Zmod=SQRT (L*mod/C*mod) and Vmod=SQRT(1/(L*mod×C*mod)), respectively, where SQRT denotes square root operation.

In a typical configuration, an input transmission line having characteristic impedance Z0 is connected to one end of the modulator and the other end of the modulator is connected to a matched load, Rload. In operation, an electrical pulse moving down the input transmission line enters the modulator transmission line and moves along it in a direction parallel to the light propagation along the modulator's waveguide. At the end of the modulator transmission line, the electrical pulse exits and encounters the load resistor, Rload.

Since Zmod=SQRT(L*mod/C*mod), the value of Zmod, may be made equal to Z0 through selecting suitable L*mod and C*mod. Under this condition, an electrical pulse may see transmission line of characteristic impedance Z0, both in the input line and in the modulator. If the value of Rload is also chosen equal to Z0, then a following two desirable conditions may be achieved: 1) the pulse travels along a transmission line whose characteristic impedance does not vary; and 2) the pulse terminates in a load which matches that characteristic impedance. Thus the problem associated with the modulator operating as a lumped device may be eliminated through incorporation of the lumped parasitic capacitance into a transmission line, which has a desirable characteristic impedance.

In a traveling-wave modulator, the velocity of propagation in the modulator, Vmod, should closely match the optical velocity in the modulator's waveguide. However, because the waveguide and transmission line are integrated into the same structure, it is difficult to simultaneously achieve the desired values for both Vmod and Zmod. The values of L*mod and C*mod, on which both Vmod and Zmod depend, are already restricted by the requirements of proper modulator design. Consequently, there may not be sufficient degrees of freedom to achieve all design goals simultaneously. This is a basic problem in the design of traveling-wave modulators of a continuous variety, where a single continuous modulator is used.

In an exemplary embodiment according to the present invention, the modulation function is separated from the transmission line function using a traveling-wave modulator of a lumped variety, thereby allowing for simultaneously achieving desired values for both Vmod and Zmod. In the described embodiment, the continuous modulator is replaced by two or more lumped modulator segments connected by inductive elements. For example, it can be viewed as though the length of the original modulator has been subdivided into modulator segments, which are then spatially separated along the length of the waveguide. Because the light travels through the same total length of modulator, the ability to control the amount of light passing through the waveguide (that is, the extinction ratio) remains the same.

FIG. 1 illustrates an optical communication system 100, in which an exemplary embodiment according to the present invention may be applied. The optical communication system 100 includes a transmitter 102, a transmission medium 104 and a receiver 106.

The transmitter 102 includes an optical source 108. The optical source 108 in an exemplary embodiment, for example, may include a laser (e.g., 1548.6 nm distributed feedback (DFB) laser or any other suitable laser known to those skilled in the art). The output provided by the optical source 108 may be modulated in a modulator 110 by a modulation signal 114 to generate a train of pulses at the frequency of the modulation signal.

The modulator 110 in an exemplary embodiment may include a segmented traveling-wave modulator, an electro-absorption modulator (EAM) or any other suitable modulator known to those skilled in the art. The segmented traveling-wave modulator may include EAM segments. The modulation signal 114 may include a sinusoidal Rf tone at a desired frequency, such as, 10 GHz, 40 GHz, 80 GHz, etc.

The train of pulses generated by the modulator 110 may then be modulated by a data modulator 112 using data 116. In an exemplary embodiment according to the present invention, the data modulator 112 may include a segmented traveling-wave modulator, which may include EAM segments. In other embodiments, the data modulator 112 may include a lithium niobate (LiNbO$_3$) modulator, an EAM or any other suitable modulator known to those skilled in the art.

In practice, the transmitter 102 may include various different components in addition to the components illustrated in FIG. 1. For example, the transmitter 102 may also include amplifiers (e.g., erbium-doped fiber amplifier (EDFA)) for boosting the optical signal before and/or after modulation in the data modulator 112.

Figure 2:
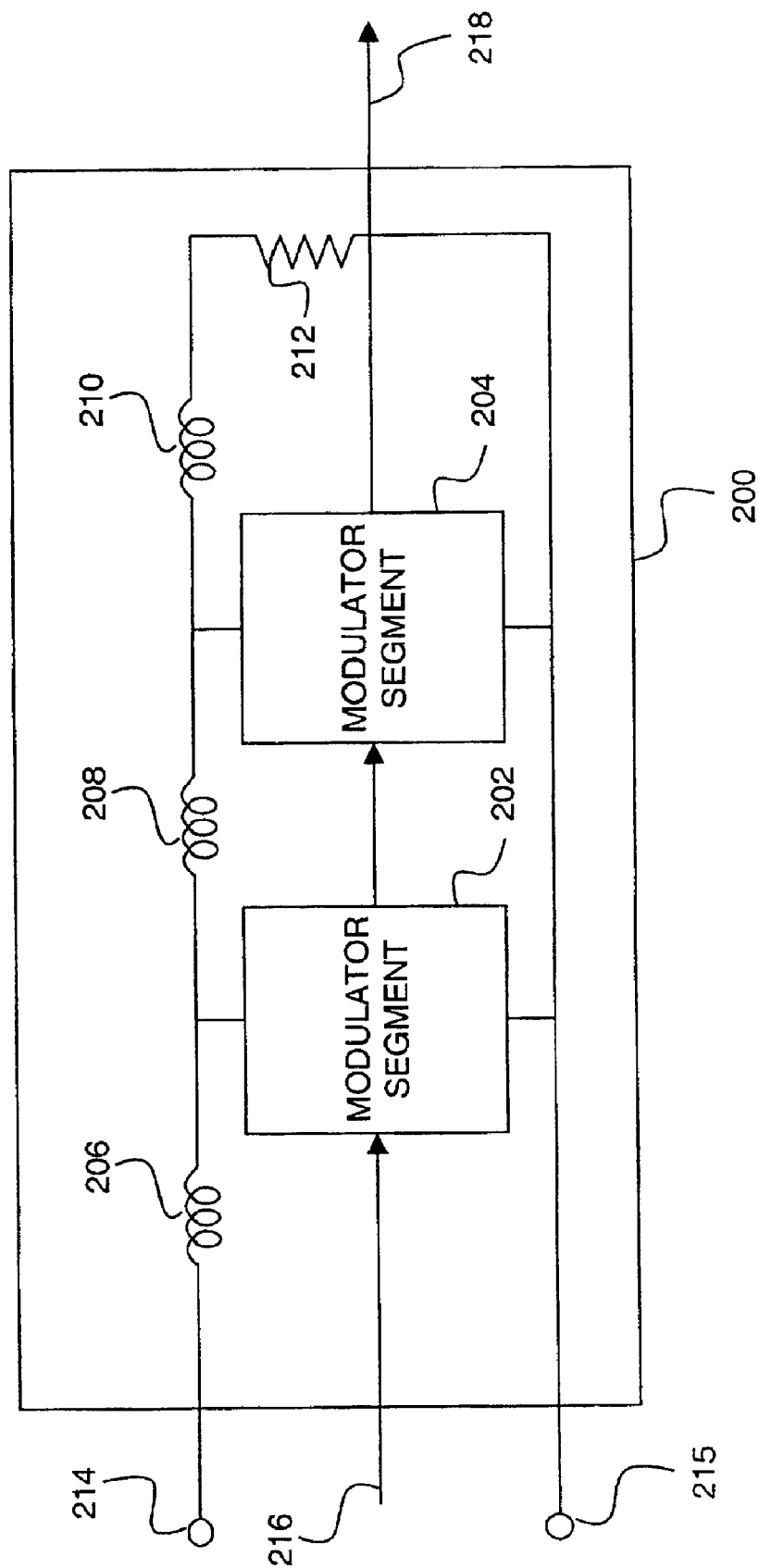
FIG. 2 illustrates a segmented modulator in an exemplary embodiment according to the present invention.

FIG. 2 illustrates a modulator 200, which includes a segmented traveling-wave modulator, which may include EAM segments, in an exemplary embodiment according to the present invention. The exemplary modulator 200, for example, may represent a more detailed illustration of the modulator 110 and/or the data modulator 112 of FIG. 1.

In the exemplary modulator 200, the modulator portion of the waveguide is broken into two spatially separated modulator segments 202 and 204. By dividing the modulator into segments, and using a traveling wave design, the active length of the modulator and thus the total capacitance of the modulator can be increased while the capacitance per unit length of the modulator can be maintained at a level that allows impedance matching and velocity matching. Thus, the segmentation may allow for a use of longer total modulator length for the same bandwidth, which may result in both the greater extinction ratio and higher saturation power.

The segmented modulator of FIG. 2 includes two 50 μm long modulator segments, each having a separate bonding pad. For example, a corresponding non-segmented modulator may have a length of approximately 100 μm. In other embodiments, the length of the modulator segments may be different. Further, the modulator portion of the cavity may be broken up into three or more spatially separated segments in other embodiments.

The modulator segments 202 and 204 are separated by a buffer section of the waveguide, which may be referred to as a buffer cavity. The buffer cavity may be longer in length than each of the segmented modulators, and may even be longer than the original non-segmented modulator. This is due to the fact that there is a limit to the capacitance that may be loaded on the transmission line per unit length and still achieve velocity and impedance matching at the same time.

The modulator 200 receives an optical signal 216, which is provided to the waveguide of the modulator. The optical signal 216 is modulated by a modulation signal (e.g., a data signal or a clock signal) provided at an electrical input terminal 214 of the modulator 200. An electrical input terminal 215 represents a negative terminal (or ground) associated with the transmission line formed within the modulator 200. The optical signal is modulated by the modulation signal in the modulator segments 202 and 204 into a modulated optical signal, which is provided as an output 218.

The submount material for the modulator 200 may include aluminum nitride (AlN), due to its low loss characteristic. The submount may also be formed from alumina, silicon (Si), beryllium oxide (BeO) or any other suitable material, which does not conduct electricity while conducting heat. Using a Si submount however, may cost about 0.5 dB of response at 40 GHz (i.e., ~3 to 4 GHz) compared to when AlN submount is used.

The inductive elements 206, 208 and 210, respectively, are disposed before an electrical input to the modulator segment 202, between electrical inputs to the modulator segments 202 and 204, and after the electrical input to the modulator segment 204. The inductive elements 206, 208 and 210 may, for example, be inductors fabricated from coils of wire or other suitable material. In other embodiments, the modulator 200 may not include inductive elements in the path of the electrical signal applied at the electrical input terminal 214.

The arrangement of modulator segments connected by the inductive elements 206, 208 and 210 acts as an effective transmission line. For example, suppose the modulator segments 202 and 204 are spaced from each other by a distance d (center to center), the inductance of each inductive element is L, and the parasitic capacitance of each segment is Cseg. The arrangement may then have an inductance per unit length and a capacitance per unit length of C*eff=Cseg/d and L*eff=L/d, respectively. Thus, the arrangement of modulator segments 202, 204 and inductive elements 206, 208, 210 should look like a transmission line with characteristic impedance and propagation velocity given by Zeff=SQRT(L*eff/C*eff) and Veff=SQRT(1/(L*eff×C*eff)), respectively.

As in the case of the traveling-wave modulator of the continuous variety, a design should be created such that the value of Zeff is equal to the characteristic impedance of the input transmission line, and such that the value of Veff is equal to the optical velocity in the waveguide. Because the inductive elements are not inherent parts of the modulator, an effective transmission line with the desired Zeff and Veff values may be achieved using the inductive elements.

For a system operated at very high bit rates and therefore very high frequency, it may be difficult to use conventional inductors such as coils of wire for the inductive elements. This is because conventional inductors tend to be dominated by complex parasitics at very high frequencies, so that they may operate poorly.

An alternate way to implement the inductive elements is to employ a transmission line of high characteristic impedance. This transmission line may be made up of two conductors. One may be connected sequentially to each surface contact pad on each modulator segment. The other conductor of the transmission line may be a common connection contact, which may be either the conductive substrate itself, or the connection contact provided in the case that the substrate is not conductive. The first conductor may be referred to as a signal conductor while the second may be referred to as a ground conductor or ground plane.

Figure 3:
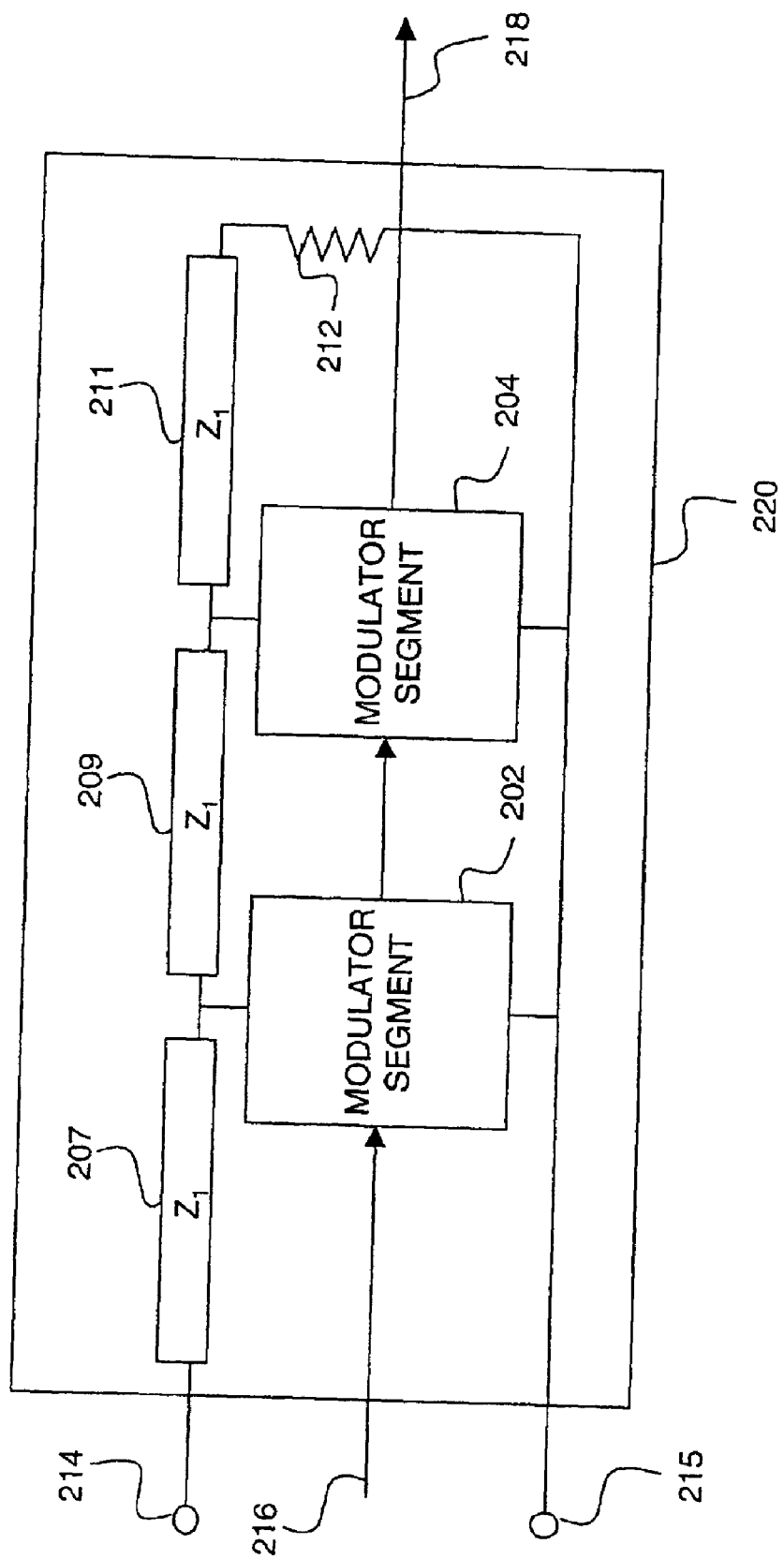
FIG. 3 illustrates a segmented modulator having transmission line segments as inductive elements in another exemplary embodiment according to the present invention.

FIG. 3 illustrates a modulator 220 having transmission line segments as inductive elements in another exemplary embodiment according to the present invention. The modulator 220 is similar to the modulator 200 of FIG. 2, except that inductive elements 207, 209 and 211 include segments of a transmission line with high characteristic impedance. In other embodiments, the modulator 220 may not include transmission line segments or other inductive elements in the path of the electrical signal applied at the electrical input terminal 214.

Due to the separation between the modulator segments 202 and 204, the inductive element (i.e., transmission line segment) 209 may actually be the longest of three inductive elements 207, 209 and 211. These transmission line segments may be air gap mounted on the submount so that most of the electric field is in the air.

For example, the modulator segments 202 and 204 may be separated by a 350 µm of buffer cavity (waveguide buffer section). As the separation between the two modulator segments becomes smaller and smaller, the segmented modulator may behave closer and closer to the original unsegmented modulator.

The inductive element 209 links the conductive regions that are on a first side of each of the modulator segments 202 and 204. The conductive regions on the second side of each segment is also linked by a common connection and to the negative terminal 215. The common connection may be provided by the substrate itself if the substrate is conductive. If the substrate is non-conductive, a connecting contact may be provided to form a common connection. This may take the form of a metal trace formed on the substrate's surface with periodic connections established to the second sides of the modulator segments 202 and 204.

Imagine for a moment that the modulator segments 202 and 204 are removed so that the above transmission lines may be examined in isolation. Like many transmission lines, it may have a series inductance per length, L*1, and a shunt capacitance per length, C*1. The inductance per unit length of the line may provide the desired inductance between the modulator segments. However, the capacitance per unit length may be an unwanted side effect.

The characteristic impedance of the line may be referred to as Z1 and the line may be referred to as a Z1 line. It follows that Z1=SQRT(L*1/C*1). This expression suggests that to maximize the inductive effect of the line and to minimize the capacitive effect, Z1 should be large. Further, V1=SQRT(1/(L*1×C*1)).

Now consider the Z1 line with the modulator segments 202 and 204 in place. The combination of the line and the segments may provide an effective transmission line whose characteristic impedance and propagation velocity are different from the values of the Z1 line alone. This is because the capacitance per unit length of the Z1 line is increased by the presence of the modulator segment's parasitic capacitance, which may be referred to as Cseg. Then the capacitance per unit length of the effective line may be C*eff=C*1+Cseg/d. The inductance per length may be unaltered and remain at L*eff=L*1. The characteristic impedance and propagation velocity of the effective line can now be computed as Zeff=SQRT(L*1/(C*1+Cseg/d)) and Veff= SQRT(1/((L*1)×(C*1+Cseg/d))), respectively.

In the exemplary embodiment, transmission line segments with relatively narrow signal conductors are used as the inductive elements 207, 209 and 211 so that the impedance is kept relatively high and capacitance between the transmission line and the ground plane (e.g., on the interfacing chip) is kept relatively low. For example, each inductive element in the exemplary embodiment may be made of a transmission line segment having characteristic impedance Z1, which may be greater in magnitude than the characteristic impedance Z0 of the modulator 220. The transmisson line segements, for example, may be made of gold (Au).

There is another condition that should be met for the arrangement of modulator segements 202, 204 and inductive elements 207, 209, 211 to act like a transmisson line: the value of d should be substantially shorter than the electrical wavelength propagating along the effective line at the maximum frequency expected during operation. This wavelength may be calculated as λmaxfreq=Veff/fmax. A satisfactory value for d may be this wavelength divided by 2π, so that d corresponds to one radian of phase: d=λmaxfreq/2π=Veff/(2π×fmax). Hence, with d smaller than λmaxfreq, the lumped elements of the arrangement may blend together to form an effectively continuous distribution of inductance and capacitance.

The desired characteristic impedance of the modulator (i.e., the transmission line formed by the modulator), for example, may be 50 ohms. By choosing the proper value for the inductive elements (transmission line segments), the desired characteristic impedance of the lumped transmission line may be realized. When the characteristic impedance Z0 of the modulator 220 is 50 ohms, the impedance of the load resistor 212 should be 50 ohms as well for impedance matching.

In the exemplary embodiment, at the highest frequency of operation, e.g., at the 3 dB roll off frequency, the modulator segments may be on the order of a radian apart. Thus, there would be approximately six segments per wavelength at the roll off frequency.

Figure 4:
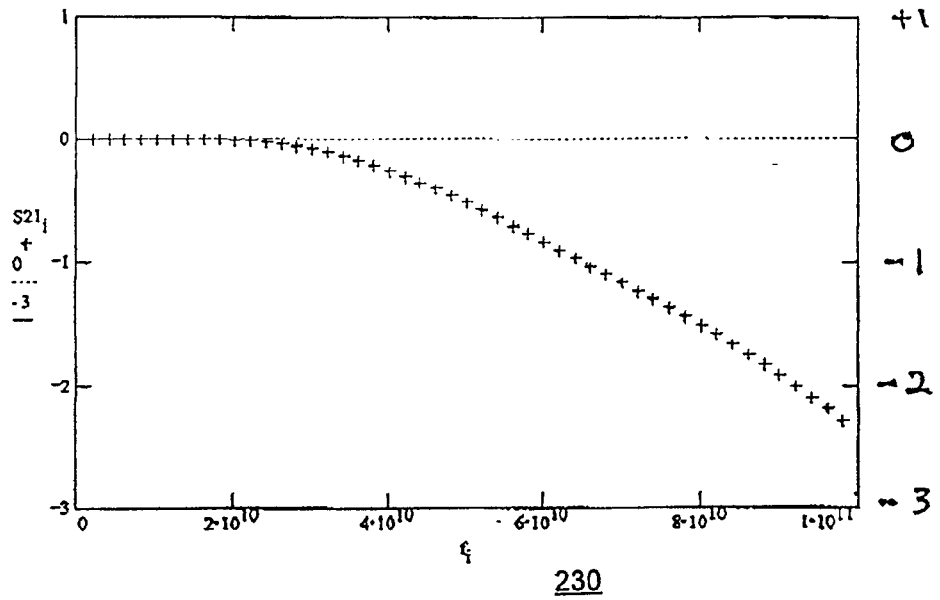
FIG. 4 illustrates a simulated frequency response of a modulator in an exemplary embodiment according to the present invention.
Figure 5:
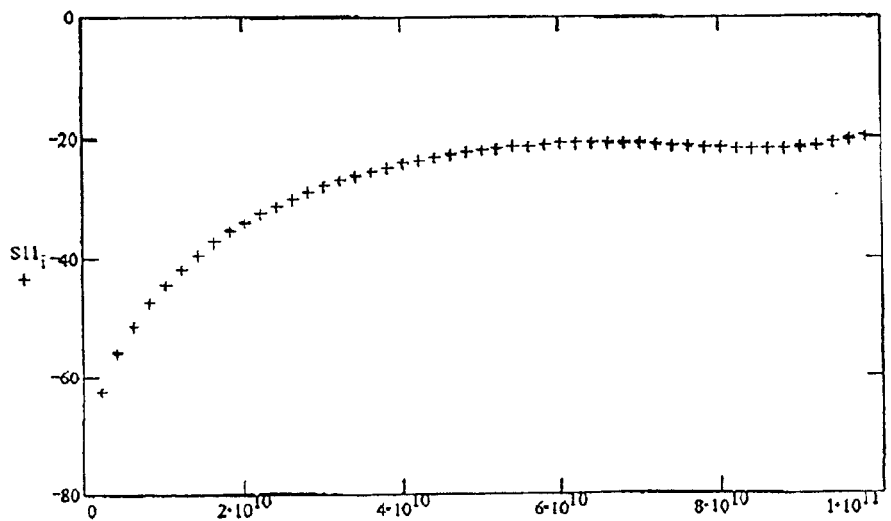
FIG. 5 illustrates a simulated return loss of a modulator in an exemplary embodiment according to the present invention.

FIGS. 4 and 5 are simulated plots for a segmented modulator in an exemplary embodiment according to the present invention. The characteristic impedance Z1 of the transmission line segments is 100 ohms. The parasitic capacitance of the unsegmented modulator is 80 femto farad (ff). The resistance of the unsegmented modulator is 10 ohms. Therefore, the capacitance of each segment of the modulator in this embodiment is 40 ff, and the resistance of each segment of the modulator is 20 ohms. Further, distance between the modulator segments (from the middle of a first modulator segment to the middle of a second modulator segment) is 250 μm.

It can be seen in an S21 (frequency response) plot 230 of FIG. 4 that the simulated 3 dB roll off frequency for S21 (frequency response) is greater than 100 GHz. This simulated frequency response is better than typical frequency responses achieved using existing modulators. This may provide extra bandwidth to compensate, for example, for driver chip bandwidth since component bandwidth should exceed system bandwidth. In addition, the bandwidth may be traded for improved extinction ratio and transfer characteristics (dB's per Volt). Further, simulated S11 (return) loss plot 240 of FIG. 5 indicates a return loss of about −20 dB at 100 GHz. This simulated return loss is better than typical return losses achieved using existing modulators.

Submount is a plate of ceramic or other suitable insulating material upon which metal and other features may be patterned. It provides electrical connection to the chip as well as other auxiliary functions. Chips are typically mounted either "active up," with the side of the chip upon which the optoelectronic devices have been fabricated facing away from the submount or "active down," with the device side facing the submount.

In the "active down" configuration, the metal features on the submount can be used as conductors of the Z1 line. For example, in an exemplary embodiment, the signal conductor may become a trace on the submount. The conductive substrate of the chip then becomes the ground conductor and the air-gap between submount and chip becomes the dielectric. Electrical connection between chip and submount is established, for instance, by solder pads formed on either chip or submount. The signal conductor makes electrical connection to each modulator segment as it is encountered. No per-segment ground connection is needed since all segments contact the common conductive substrate that serves as ground conductor.

The input transmission line (characteristic impedance Z0) that drives the modulator may have a signal conductor and ground conductor of its own. As it approaches the chip, the signal conductor of the input line may simply continue under the chip, and become a Z1 signal conductor. The ground conductor of the input line, however, should establish electrical connection to the chip's ground conductor, that is, its conductive substrate. To do this, the input ground conductor may pass under the chip a short distance and may be electrically connected to the conductive substrate, via solder pads, to electrical contacts on the chip. These contacts are similar to the contact pads on the modulator segments, except that they connect through to the conductive substrate.

At the far end of the sequence of modulator segments, connection to the load resistor (Rload=Z0) may be made in a manner similar to the input connection. The Z1 signal conductor passes out from under the chip and connects to Rload, which could be implemented as a small thin film resistor. The chip's conductive substrate connects from contact pads on the chip, via solder pads, to a ground conductor on the submount. This ground conductor is then connected to the other side of the Rload. If desired, an output line of characteristic impedance Z0, just like the input line could be used. After proceeding some distance from the chip, this output line may be terminated with a resistor of value Rload. The line and termination may look electrically similar to a direct termination with Rload.

The thickness of the solder may set the spacing between the signal conductor and ground conductor for the Z1 line. The solder can be quite thick (especially if the solder is patterned on the submount, where the photolithography requirements are not so stringent as on the chip). Other spacing components may also be used, such as pads or columns located away from the modulator segments. The combination of wide spacing with the low dielectric constant (~1.0) of the air dielectric (or nitrogen, or whatever gas the package is filled with) should make high values of Z1 and V1 easier to achieve.

By comparing the expressions for Zeff and Veff with the above expressions for Z1 and V1, it can be derived that Z1>Zeff and V1>Veff. In other words, the characteristic impedance and propagation velocity of the Z1 line are lowered by the addition of the shunt parasitic capacitance of the modulator segments. This effect may get greater and greater as the modulator is designed for higher and higher bit rates. It can be noted in the equation for d (the segment spacing), fmax is inversely proportional to d. This implies that for higher bit rates, smaller d is desired. Examining the equations for Zeff and Veff above, it can be seen that smaller d implies that Zeff and Veff are both lowered. In effect, modulator segments have been added at a higher density along the Z1 line, thereby modifying its properties more strongly.

As discussed above, in a traveling wave modulator design, Zeff should be made equal Z0 (the input characteristic impedance) and Veff should be made equal to the optical velocity in the waveguide, Vopt. It is now clear that to do this, the Z1 line should have Z1>Z0 and V1>Vopt, and that Z1 and V1 should get increasingly large as the design is to support higher and higher bit rates. Thus, producing a Z1 line with high characteristic impedance and propagation velocity is very desirable for successful modulator design.

As discussed above, the Z1 line may be formed by a signal conductor and a ground conductor. A straightforward realization for the Z1 line is to place the signal conductor on the chip, with the ground conductor provided by the substrate itself or by the common connection means previously mentioned. With such a realization, however, the desirable high characteristic impedance may be difficult to achieve. The chip is composed of semiconductor materials and insulators that generally have high dielectric constants, decreasing the characteristic impedance of any line formed on the chip.

The transmission line conductors may be placed on a polymer material (e.g., polymide), which has a lower dielectric constant. The conductors may also be made narrow to increase the line's characteristic impedance. However, these measures may be inadequate to achieve values for Z1 and V1 that are sufficiently high to satisfy the design goals, especially at high bit rates. An increase in Z1 and V1 may be more readily obtained by moving at least one of the Z1 line's conductors off the chip entirely, and placing it on the submount.

In the above description, an assumption was made that the substrate is conductive, so that is provided the common connection for the modulator segments. If a conductive common connection means is employed instead (as would be appropriate in the case of a non-conducting substrate), then everything works in basically the same way. The conductive connection means may function as the ground conductor of the Z1 line. This variant may result in lower loss in the Z1 line, since a metal connection may have lower electrical resistance than the substrate.

Thus, the Z1 line may be realized in which a part of the line is formed on the submount to which the chip is attached. The traveling-wave modulator is produced by the combination of chip and submount, and neither of these two components alone could function as a traveling-wave modulator in the exemplary embodiment.

In other embodiments, there may be other ways involving the submount to realize the Z1 line. One is to place the ground conductor of Z1 on the submount and keep the signal conductor on the chip. The other is to place both signal and ground conductors on the submount, so that only the modulator segments remain on the chip.

The first way would be appropriate if the substrate were non-conducting. Otherwise, there may be two ground conductors and high Z1 and V1 may be hard to achieve. Where the input line approaches the chip, the signal conductor may go under the chip and connect to the signal conductor on the chip by way of a solder pad. The ground conductor of the input line may continue under the chip on the submount.

The second way may be appropriate if the submount were made of a low dielectric constant material so that transmission lines fabricated on it would naturally have high Z1 and high V1. Again, it would be beneficial if the substrate were non-conducting. Connections to the chip may be made to both signal conductor and ground conductor for each modulator segment.

Figure 6:
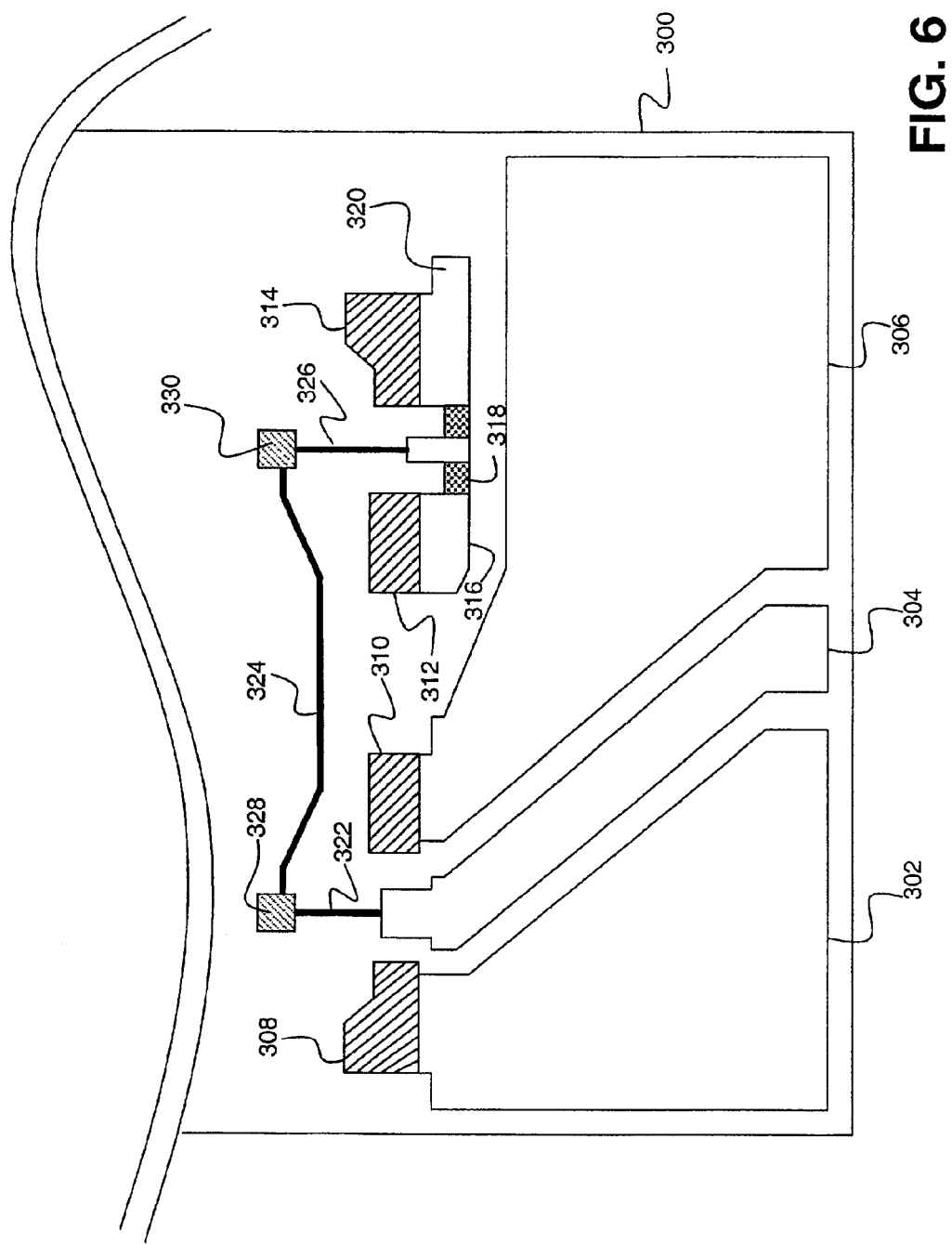
FIG. 6 is a plan view of a submount in an exemplary embodiment according to the present invention.

FIG. 6 illustrates a plan view of a submount in an exemplary embodiment according to the present invention. Bonding pads 328 and 330, respectively, are used to make electrical contact with the modulator segments of a modulator chip. Transmission line segments 322, 324 and 326 are provided as inductive elements of the transmission line. The transmission line segments 322 and 326 represent input and output transmission lines to the segmented modulator, respectively. The transmission line 324 is between the electrical contacts 322 and 326.

An additional degree of design freedom may be had by "meandering" the signal trace on the submount, that is, to make the trace follow a sinuous path of some kind. This makes the propagation velocity Veff appear to be slower, since pulses propagating down the line have a longer distance to go to get from segment to segment. One could, for example, make Z1 very high so that the condition of Zeff=Z0 is met, and wind up with Veff which is too large, so that Veff>Vopt. The cure would be to meander the Z1 line such that Veff would appear to be equal to Vopt. It can be seen that the transmission line 324 has been meandered in a "U" shape to lengthen the transmission path between the modulator segments.

Figure 7:
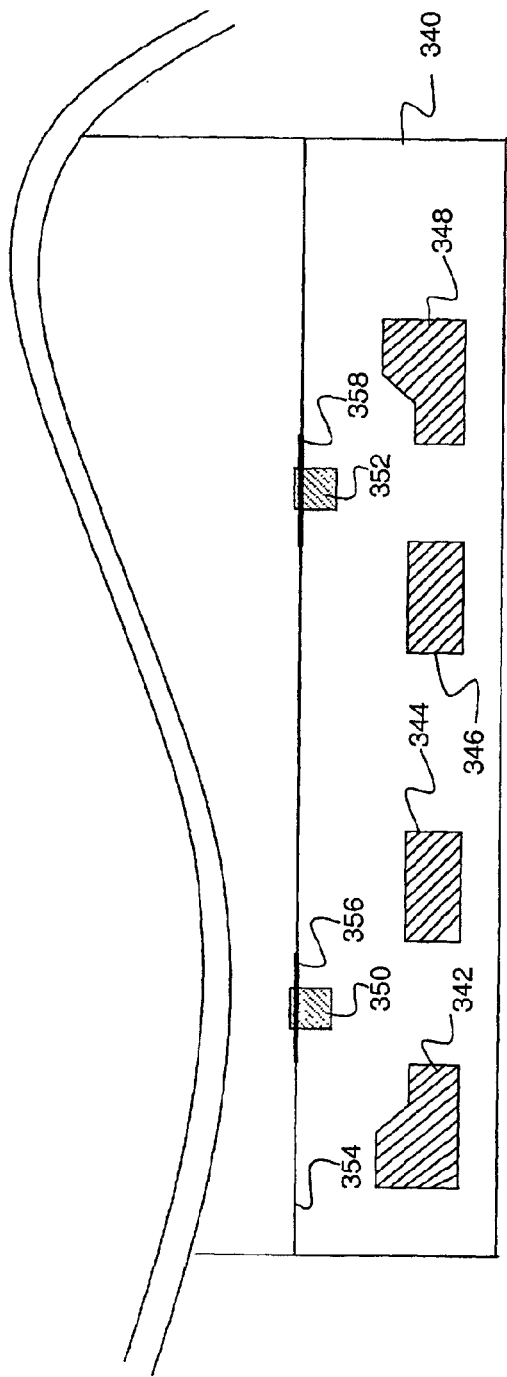
FIG. 7 is a plan view of a modulator chip in an exemplary embodiment according to the present invention.

FIG. 7 is a plan view of a modulator chip 340 in an embodiment according to the present invention. The modulator chip 340 may be placed with its active face down on top of the submount 300 of FIG. 5. Solder is deposited on solder pads 308, 310, 312 and 314. Solder may also be deposited on the bonding pads 328 and 330.

It can be seen from FIGS. 6 and 7 that electrical pads 342, 344, 346 and 348 would make electrical contact with the solder pads 308, 310, 312 and 314, respectively, of the submount 300. The electrical pads 342, 344, 346 and 348 are electrically connected to the chip substrate. They therefore establish connection between the chip substrate and the submount ground plane at both the input drive line and the matched load.

Further, it can be seen that electrical pads 350 and 352 would make electrical contact with the bonding pads 328 and 330, respectively, of the submount 300. This way, the electrical pads 350 and 352 are used to provide the electrical signal applied at a center trace 304 to be applied to modulator segments 356 and 358 through the transmission line segments 322 and 324. Thus, in the exemplary embodiment, the transmission line is formed partly by the chip and partly by the submount upon which the chip is placed. The substrate of the modulator chip 340 may be highly conductive, so that it may form a ground plane for the transmission lines.

On the submount 300, ground planes 302 and 306 form a co-planar waveguide together with a center trace 304. The modulation signal is applied at the center trace 304 for modulation of the optical signal provided through a waveguide 354 on the modulator chip. It can also be seen that a resistor 318 is disposed between the output transmission line segment 326 and the ground planes 316 and 320 (on the modulator chip 340), thus providing impedance matching.

In other embodiments, an amplifier, such as, for example, a semiconductor optical amplifier (SOA), may be placed between the modulator segments 356 and 358 in order to reduce loss to the strength of the optical signal, for example, due to absorption in the modulation segments. Use of the SOA may even result in a gain of signal strength in the modulator.

Figure 8:
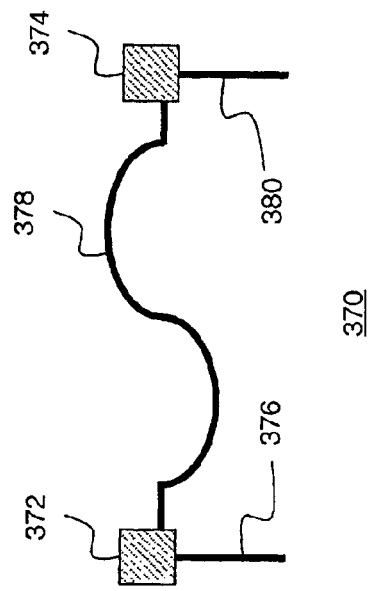
FIG. 8 illustrates a transmission line segment between two modulator segments in another exemplary embodiment according to the present invention.

In FIG. 8, contacts 372 and 374 represent electrical contacts to be made with the modulator segments. Transmission lines 376 and 380 represent input and output transmission lines to the segmented modulator, respectively. The transmission line 378 is between the electrical contacts 372 and 374. It can be seen that the transmission line 378 has been meandered in an "S" shape to lengthen the transmission path between the modulator segments.

In other embodiments, the transmission line between the two electrical contacts may have shapes other that "U" or "S" shapes. Further, in other embodiments, the transmission lines that carry electrical signals in and out of the segmented modulator may be shaped so as to lengthen the signal path between the two modulator segments.

As described herein, the segmented modulator provides an increased extinction ratio (on/off ratio) for a device of the same bandwidth using the same fundamental technology (i.e., waveguide design and quantum well active region). The present invention may benefit from the low series resistance of the DRBH modulator structure. Implementing the embodiments of the present invention does not require any change in chip technology, since it can be realized through a rearrangement of existing elements as described herein.

Although this invention has been described in certain specific exemplary embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents.

For example, in other embodiments, the segmentation of cavity may also be applied to cavity-type PINs and/or APDs (Avalanche Photodiodes) to divide them into their respective segments.

We claim:

1. An optical modulator suitable for application in a transmitter, said optical modulator comprising:
   a first modulator segment;
   a second modulator segment, said first and second modulator segments comprising an optical signal path for an optical signal; and
   an electrical signal path capable of receiving and carrying a modulation signal, wherein the electrical signal path comprises an inductive element disposed between the first and second modulator segments,
   wherein the modulation signal is applied to the optical signal at said first and second modulation segments to generate a modulated optical signal.

2. The optical modulator according to claim 1, wherein the first and second modulator segments comprise segments of an electro-absorption modulator (EAM).

3. The optical modulator according to claim 1, said optical modulator capable of operating as a transmission line, wherein propagation velocity on the transmission line substantially matches an optical velocity on the optical signal path.

4. The optical modulator according to claim 1, wherein the inductive element comprises a transmission line segment having a first characteristic impedance, said first characteristic impedance being higher than a characteristic impedance of a transmission line comprising the first modulator segment, the second modulator segment and the inductive element.

5. The optical modulator according to claim 1, wherein the inductive element comprises an inductor.

6. The optical modulator according to claim 1, wherein the inductive element comprises a transmission line segment having a first propagation velocity, said first propagation velocity being higher than a propagation velocity of a transmission line comprising the first modulator segment, the second modulator segment and the inductive element.

7. The optical modulator according to claim 1, wherein the electrical signal path further comprises at least one inductive element at an input of the first modulator segment, and at least one inductive element at an output of the second modulator segment.

8. The optical modulator according to claim 1, wherein the distance between the first and second modulator segments is greater than at least one of the length of the first modulator segment and the length of the second modulator segment.

9. The optical modulator according to claim 4, wherein the length of a portion of the electrical signal path between the first and second modulator segments is greater than at least one of the length of the first modulator segment and the length of the second modulator segment.

10. The optical modulator according to claim 9, wherein the length of said portion of the electrical signal path between the first and second modulator segments is lengthened by meandering the transmission line segment.

11. The optical modulator according to claim 9, wherein the length of said portion of the electrical signal path between the first and the second modulator segments is determined to substantially match a propagation delay of the modulation signal on said portion of the electrical signal path between said modulator segments to the propagation delay of the optical signal on the optical signal path between said modulator segments.

12. The optical modulator according to claim 1, further comprising a resistive element in series with the inductive element, wherein the resistive element is capable of impedance matching.

13. The optical modulator according to claim 3, wherein the optical modulator is mounted on a submount selected from a group consisting of silicon (Si), aluminum nitride (AlN), alumina and beryllium oxide (BeO).

14. The optical modulator according to claim 13, wherein the optical modulator is implemented on a chip, and wherein the transmission line is formed partly on the optical modulator chip and partly on the submount.

15. The optical modulator according to claim 14, wherein a substrate of the optical modulator chip forms a ground plane for the transmission line.

16. The optical modulator according to claim 14, wherein the submount has formed thereon at least two ground planes and a center trace between them, wherein said at least two ground planes and the center trace form a coplanar waveguide.

17. The optical modulator according to claim 1, wherein a center-to-center distance between the first and second modulator segments is substantially less than the wavelength corresponding to an expected maximum frequency during operation.

18. The optical modulator according to claim 17, wherein the center-to-center distance is approximately $(1/2\pi)$th of said wavelength corresponding to the expected maximum frequency.

* * * * *